2,815,933

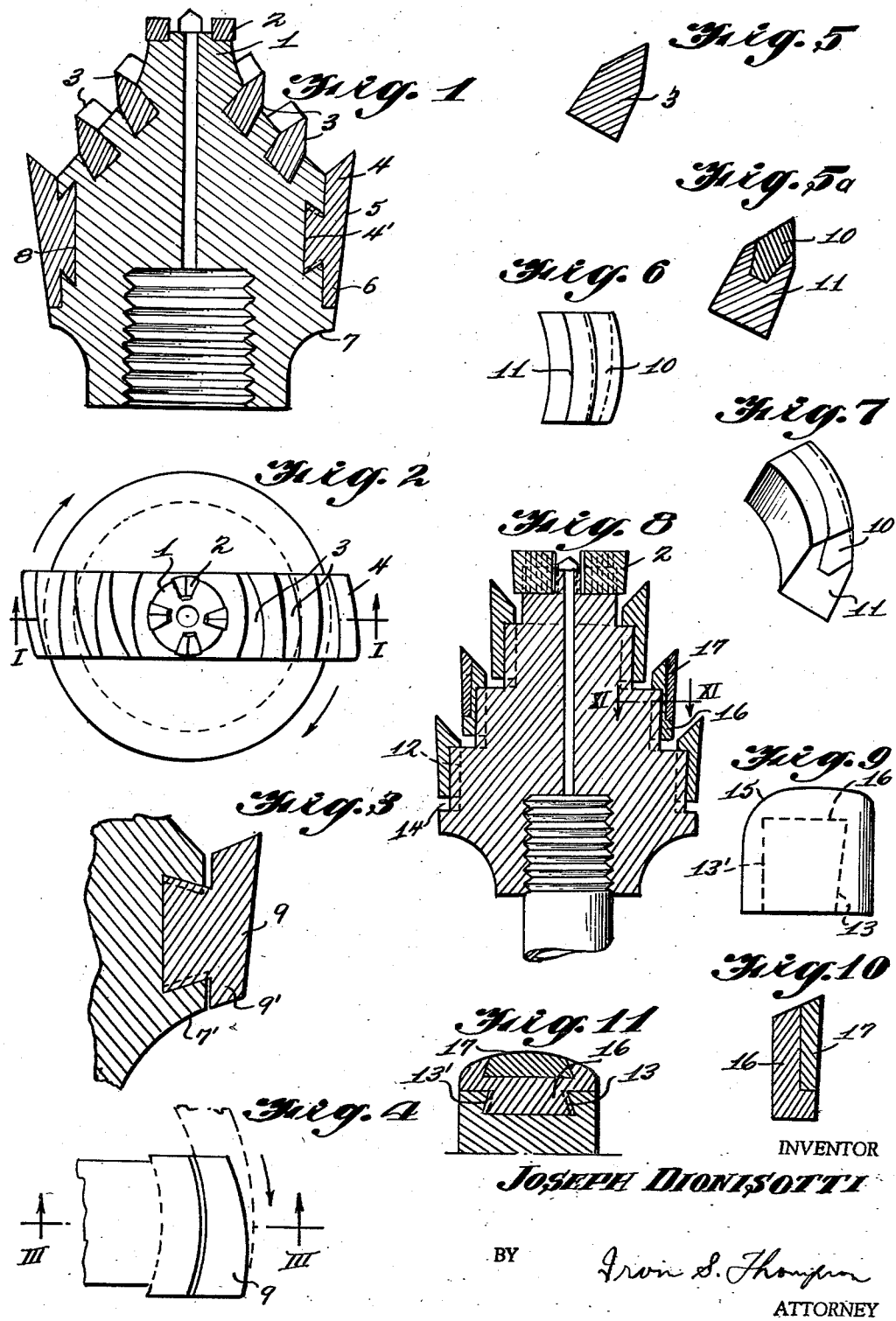

DETACHABLE DRILL BIT INSERT FOR ROCK BORING TOOLS

Joseph Dionisotti, Monthey, Switzerland

Application October 1, 1952, Serial No. 312,481

Claims priority, application Switzerland October 2, 1951

4 Claims. (Cl. 255—61)

My invention has for its object a detachable drill bit insert for insertion in a rock drilling tool, such as a bit, a miner's bar or the like boring tool. According to my invention, the longitudinal surfaces of said drill bit insert are of partial conical shape and diverge, starting from their inner edges towards their outer edges and also in planes perpendicular to the axis of the tool, whereby the drill bit inserts may be securely held by the tool without requiring any soldering or welding.

I have illustrated by way of example, in accompanying drawings, a preferred embodiment of my improved drill bit insert intended as an insert in a rock drilling tool. In said drawings:

Figs. 1 and 2 show a stepped bit provided with bit inserts of different shapes that are held in suitable grooves or recesses formed in the body of the bit head. Fig. 1 is a vertical cross-section of the bit through line I—I of Fig. 2 and Fig. 2 is a plan view thereof.

Figs. 3 and 4 show on a larger scale a modification of the bit inserts at the outer periphery of the stepped bit illustrated in Figs. 1 and 2, Fig. 3 being a partial cross-section through line III—III of Fig. 4 and Fig. 4 being a view from above of the bit insert shown in Fig. 3.

Figs. 5 to 7 illustrate a second embodiment of a bent conical bit insert adapted to be fitted in the stepped annuli of the bit illustrated in Figs. 1 and 2, said bit insert being inserted in a corresponding groove of the bit without requiring soldering or welding. Fig. 5 is a vertical sectional view of a one-part bit insert while Fig. 5a shows a modification wherein the bit insert is formed by two interengaging parts. Fig. 6 is a plan view corresponding to Fig. 5a and Fig. 7 is a perspective view of the same bit insert.

Figs. 8 to 11 illustrate a modification of the stepped bit illustrated in Figs. 1 and 2. Fig. 8 is an axial cross-section of said bit and Fig. 9 a front view of a bit insert adapted to be fitted in one of the steps of the bit. Fig. 10 is a vertical cross-section through a bit insert having an insert forming the actual cutter, said bit insert being somewhat similar to that illustrated in Fig. 5a; and Fig. 11 is a horizontal cross-section through line XI—XI of Fig. 8.

The drill bit inserts according to my invention may have various shapes which differ according to their location on the tool carrying it. The stepped bit illustrated in Figs. 1 and 2 carries three different types of bit inserts, all of which are formed to have anchoring portions adapted to be received in grooves in the head of the drilling tool. The anchoring portions are of trapezoidal cross section with the flanks of the anchoring portion of the cutter bit inserts only slightly inclined relative to the base of the anchoring portion in dove-tail fashion. Moreover, the flanks of said anchoring portion are formed so that they converge slightly from one end of the bit insert to the other. The grooves in the head of the drilling tool have their side walls similarly inclined to their base and converged from one end of the groove to the other. With this formation of the grooves in the head of the drilling tool as shown in Fig. 2 and similar formation of the anchoring portion of the cutter bit inserts the latter may have their end of smallest cross section inserted in the end of the groove, of largest cross section and the bit insert driven into the groove so that the smallest end of the bit insert is moved toward the smallest end of the groove. The cooperating tapering portions of the groove and bit insert serve to jam or wedge the bit insert tightly in the groove. Impacts of the bit insert against the formation being drilled will serve to more tightly jam or wedge the bit inserts in their grooves rather than to loosen them.

As shown in Fig. 2 the direction of taper of the grooves in the tool head and of the anchoring portions of the bit inserts are so oriented relative to the direction of movement of the tool head as to insure the tightening of the bit inserts in the grooves of the tool head during use of the tool. The flanks of the bit inserts or of the anchoring portion thereof may be smooth, corrugated or fluted. The construction of the bit inserts and their receiving grooves serve to securely anchor the cutter bit inserts in the tool head without any extraneous securing means, welding or soldering.

On the tip 1 of the bit are secured conventional cutters or bit inserts 2 housed in grooves disposed in pairs in two planes which are perpendicular to each other. The bit is further provided with three tiers of bit inserts that are fitted therein along a diametrical plane.

The next two tiers of cutters are in the form of bit inserts 3 shown in detail in Figs. 5–7. These bit inserts are curved from one end to the other as clearly shown in Figs. 2, 6 and 7.

The third tier of cutters provided at the periphery of the bit comprises bit inserts 4 the bases of which are secured in the bit by dovetail anchoring portions as hereinbefore described. The outer cutting surface 5 of insert 4 has a radius of curvature which is proportional to the diameter of the tiers with which it cooperates as it comes into contact with the rock and it has a comparatively large surface so as to have a greater resistance against wear. This outer surface 5 is provided with a double inclination relative to two orthogonal directions, one of which is parallel with the axis of the bit and the other of which is substantially perpendicular to said axis.

The outer radius of curvature of the drill bit insert decreases gradually with reference to the outer diameter of the tool so as to have a lesser friction with reference to the rock whereby the waste material engaging the interval between the tool and the rock may be removed without any wedging while consequently the rotation of the tool is made easier and its progression is more speedy.

Furthermore, the cutter or bit insert bears through its lower flange portion 6 against a flange 7 provided on the bit whereby it resists more readily the shocks transmitted by the bit to the bit inserts. The cutter or bit insert also engages the bit through a dove-tailed radial projection 8 or anchoring portion fitted inside a corresponding groove of the tool head.

In a modification, the peripheral bit insert 9 (Figs. 3 and 4) is similar to the bit insert 4 illustrated in Figs. 1 and 2, but it differs therefrom by the fact that its flange 9' does not bear against the flange 7' of the bit and is slightly spaced with reference thereto so that the stresses arising during operation may be transmitted solely through the dove-tailed projection on the bit insert.

The bit insert may, in all the embodiments of my invention disclosed hereinabove, be made of several parts; its tip 10 (Fig. 5a) may be made for instance of hard metal or alloy steel and it is fitted, in this case, on a body 11, made of a less resistant metal, to which body it is welded or soldered.

Figs. 8 to 11 illustrate a stepped bit in which only the bit inserts 2 carried by the tip of the bit are anchored as in Figs. 1–7 while the bit inserts carried on the three other steps or tiers of the bit are anchored on the body of the bit by an axial driving thrust, said latter bit inserts being provided with a rectilinear dove-tailed anchoring portion 12, the lateral sides 13 and 13' of which dovetailed portion converge as shown in Fig. 9, the outer lateral surfaces being provided with two slopes as in the case of the bit insert 4 illustrated in Fig. 1.

When mounting the bit inserts, it is necessary to provide a gap 14 between the surface of the bit insert and the bearing flange of the tool in order to allow a settling of the bit insert as produced by the shocks transmitted by the tool during operation.

Furthermore, the cutting edge 15 (Fig. 9) of the bit insert has a curved shape having a decreasing radius of curvature, with a view to providing an improved progression during perforation and an easier rotation of the tool while the bit insert is protected against any possible chipping of its edge.

Lastly, the bit insert 16 illustrated in Figs. 8, 10 and 11 is provided with a tip-forming insert 17 made of hard metal or of alloy steel and the shape of which is somewhat different from that of the insert tip 10 on the bit insert illustrated in Fig. 5a.

As in the case of the preceding embodiments, the bit inserts may be fitted inside their recesses in any desired manner without being welded or soldered although welding or soldering is also possible.

Obviously, the outlines of the sides of the bit inserts may include one or more corrugations or flutings of any suitable shape.

The above-described embodiments of the bit inserts may be associated with any other embodiment without modifying the inherent properties of the bit inserts.

According as to whether the bit inserts are driven into their recesses through their upper end or laterally, they bear laterally against the tool or else engage their recesses through their lower surface while they are held laterally. Normally, the bit inserts are all secured inside the grooves of the tool without it being necessary to weld them or to solder them.

Obviously, the bit inserts, instead of having bent longitudinal surfaces, may be rectilinear.

Among the various advantages of my improved bit inserts, I may mention their large contacting surfaces at their lower ends whereby they may more readily resist any shocks.

Whenever any play arises between the bit insert and the actual tool, the bit insert will sink automatically into the conical groove of the tool under the action of the friction of the latter against the material to be cut with an automatic compensation of the clearance that may have arisen.

It is easy to change the above-described bit inserts by reason of the fact that they are normally secured without any welding.

In all the above mentioned cases, it is easy to insert the bit inserts by means of a hammer or the like and their extraction is similarly executed in an easy manner.

What I claim is:

1. A rock drilling tool comprising a tool head having a groove and a cutting drill bit insert removably anchored in said groove, said insert having a cutting edge and an anchoring portion receivable in said groove, said groove having a flat bottom and two walls converging from the bottom towards each other and from one end of the groove to the other with the larger end of the groove open in the direction of rotation of the tool head, said anchoring portion of the insert having a formation similar to that of the groove and adapted to be seated in said groove; said insert having an outer curved surface with the radius of curvature decreasing gradually with reference to the outer diameter of the tool head; said groove and insert being similarly curved and having a radius of curvature which progressively decreases in relation to the periphery of the tool head, whereby said groove and bit are oriented with respect to the direction of rotation of the drilling tool about its longitudinal axis so that the bit insert is urged tightly between the converging walls of the groove by forces applied to the bit insert during the rotary drilling operation of the tool.

2. A rock drilling tool as set forth in claim 1, wherein said tool head is provided with a peripheral flange upon which a portion of the insert bears, and wherein the diameter of the cutting edge of the insert is greater than the diameter of the flange and the diameter of the base of the insert is equal to the diameter of the flange.

3. A rock drilling tool as set forth in claim 2, wherein the cutting portion of the insert is radially spaced from the outer peripheral portion of the tool head.

4. A rock drilling tool as set forth in claim 1, wherein the base of the groove and the base of the anchoring portion of the cutting bit insert lie partly in a plane parallel to a plane containing the axis of rotation of the tool head, and wherein the exterior surface of the cutting bit insert that engages the rock to be drilled is inclined in relation to the said axis of rotation, whereby the exterior diameter of the insert decreases axially from the leading end of the tool towards the trailing end thereof.

References Cited in the file of this patent

UNITED STATES PATENTS

| | | |
|---|---|---|
| 143,535 | Sheldon | Oct. 7, 1873 |
| 236,401 | Adams et al. | Jan. 11, 1881 |
| 516,952 | Trounson | Mar. 20, 1894 |
| 710,484 | Mackenzie | Oct. 7, 1902 |
| 792,344 | Olan | June 13, 1905 |
| 821,202 | Thomas | May 22, 1906 |
| 884,150 | Hardsocg | Apr. 7, 1908 |
| 1,106,966 | Pauli | Aug. 11, 1914 |
| 1,318,958 | Bernay | Oct. 14, 1919 |
| 1,359,318 | Bernay | Nov. 16, 1920 |
| 1,510,871 | Swaim | Oct. 7, 1924 |
| 1,516,601 | Hawkesworth | Nov. 25, 1924 |
| 1,589,596 | Hokanson | June 22, 1926 |
| 1,703,390 | Duffy | Feb. 26, 1929 |
| 1,807,646 | Wright | June 2, 1931 |
| 1,879,222 | Harrington | Sept. 27, 1932 |
| 1,940,890 | Stokes | Dec. 26, 1933 |
| 2,101,376 | Voigtlander | Dec. 7, 1937 |
| 2,104,822 | Scott | Jan. 11, 1938 |
| 2,121,202 | Killgore | June 21, 1938 |
| 2,154,960 | Sanderson | Apr. 18, 1939 |
| 2,205,238 | Burt | June 18, 1940 |
| 2,306,598 | Ellson | Dec. 29, 1942 |
| 2,579,720 | Atkinson | Dec. 25, 1951 |
| 2,614,813 | Shepherd | Oct. 21, 1952 |

FOREIGN PATENTS

| | | |
|---|---|---|
| 11,646 | Great Britain | Feb. 28, 1907 |
| 113,847 | Australia | Sept. 25, 1941 |
| 668,991 | Great Britain | Mar. 26, 1952 |